(12) United States Patent
Hashimoto et al.

(10) Patent No.: US 7,578,940 B2
(45) Date of Patent: Aug. 25, 2009

(54) MEMBRANE CARTRIDGE, MEMBRANE SEPARATING DEVICE, AND MEMBRANE SEPARATING METHOD

(75) Inventors: Tomotaka Hashimoto, Fuji (JP); Daisuke Okamura, Fuji (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 325 days.

(21) Appl. No.: 10/561,182

(22) PCT Filed: Jun. 15, 2004

(86) PCT No.: PCT/JP2004/008334

§ 371 (c)(1),
(2), (4) Date: Dec. 16, 2005

(87) PCT Pub. No.: WO2004/112944

PCT Pub. Date: Dec. 29, 2004

(65) Prior Publication Data

US 2006/0157400 A1  Jul. 20, 2006

(30) Foreign Application Priority Data

Jun. 17, 2003 (JP) ............................. 2003-172495

(51) Int. Cl.
*B01D 65/02* (2006.01)
*B01D 63/02* (2006.01)

(52) U.S. Cl. ............. 210/636; 210/321.61; 210/321.69; 210/321.79; 210/321.88; 210/500.23; 96/8; 96/10

(58) Field of Classification Search ............ 210/321.61, 210/321.88, 500.23; 96/8, 10
See application file for complete search history.

(56) References Cited

U.S. PATENT DOCUMENTS 6,331,248 B1 * 12/2001 Taniguchi et al. ........ 210/321.8
6,620,319 B2 * 9/2003 Behmann et al. ....... 210/321.69

FOREIGN PATENT DOCUMENTS

| EP | 1 310 291 A1 | 5/2003 |
|---|---|---|
| JP | 04-046170 | 7/1992 |
| JP | 2000-157846 | 6/2000 |
| WO | WO 00/18498 | 4/2000 |
| WO | WO 02/04101 A1 | 1/2002 |

* cited by examiner

Primary Examiner—John Kim
(74) Attorney, Agent, or Firm—Finnegan, Henderson, Farabow, Garrett & Dunner, L.L.P.

(57) ABSTRACT

A membrane separating method and a membrane separating device capable of preventing sludge from being accumulated on the surface of hollow fiber membranes in a membrane cartridge and having filtration performance stably sustained for a long period. The membrane cartridge formed by sticking and fixing both ends of two or more hollow fiber membranes arranged in the vertical direction is formed in such a structure that the collected state of the hollow fiber membranes on an upper side adhesive boundary surface is divided into a plurality of hollow fiber membrane bundles.

7 Claims, 4 Drawing Sheets

MEMBRANE CARTRIDGE, MEMBRANE SEPARATING DEVICE, AND MEMBRANE SEPARATING METHOD

TECHNICAL FIELD

The present invention relates to a pressure or suction type tank filter device, and to a filter cartridge using hollow fiber membranes to be installed in an immersion type filter device. More specifically, the present invention relates to a hollow fiber membrane cartridge used for a filter device that removes turbidity and bacteria from raw water such as river water, lake water, underground water, seawater, domestic waste water, industrial waste water, or sewage secondary treated water, or for a membrane separation activated sludge device that uses membranes to separate activated sludge into solids and liquids.

BACKGROUND ART

As a waste water treatment method, there has been used a membrane separation activated sludge method in which a membrane cartridge is immersed in an activated sludge tank and a solid-liquid separation is carried out between the activated sludge and the treated water after treatment. This method allows the concentration of the activated sludge (MLSS: Mixed Liquor Suspended Solid) to be set at a very large value of from 5,000 to 20,000 mg/l in the filtering process. This advantageously allows the capacity of the activated sludge vessel to be reduced or enables a reaction time in the activated sludge vessel to be shortened. Further, filtration with the membranes prevents suspended solids (SS) from being mixed into the treated water, thus eliminating the need for a final sedimentation tank. This makes it possible to reduce the construction area of the treatment facility and to achieve filtration regardless of whether or not activated sludge is appropriately sedimented. This method thus has advantages such as a reduction in the burden of activated sludge control. Therefore, in recent years, the membrane separation activated sludge method has rapidly prevailed.

If hollow fiber membranes are used for the membrane cartridge, the high strength of the membranes themselves reduces the chances of the surfaces of the membranes from being damaged as a result of contact with contaminants contained in the raw water. The membrane cartridge can thus be used for a long period. Moreover, this structure has the advantage of being capable of being back washed by reverse filtration. That is, by injecting a medium such as treated water in a direction opposite to that of filtration, fouling can be removed from the surfaces of the membranes. In this case, however, the effective area of the membranes may be reduced unless the filtration is carried out while preventing aggregates of activated sludge as well as contaminants in the raw water from accumulating in the gap between the hollow fiber membranes. As a result, filtration efficiency will be lowered, thus preventing a stable filtration from being maintained over a long period.

The bottom of the membrane cartridge has been conventionally aerated in order to avoid sludge or the like from accumulating on the surfaces of the hollow fiber membranes or between the hollow fiber membranes. This causes the membranes to oscillate and agitating bubbles to rise upward, thus removing any aggregates of activated sludge as well as contaminants in the raw water from the surfaces of the hollow fiber membranes or from between the hollow fiber membranes. Consequently, aggregates and contaminants are prevented from accumulating. For example, a lower ring (or skirt) can be installed at the bottom of the hollow fiber membrane cartridge. Further, a plurality of through-holes can be formed in a lower ring-side adhesion fixation layer. Then, the bottom of the cartridge is aerated to form a pool of air in the end of the lower ring projecting from the lower ring. Thus, bubbles are uniformly generated in the plurality of through-holes. This allows easy removal of suspended substances that have accumulated on the outer surfaces of the hollow fiber membranes (see, for example, JP-A-2000-157846).

If a high concentration MLSS is filtered by the membrane separation activated sludge method, sludge can be released from between the hollow fiber membranes by agitation based on aeration as well as oscillation of the membranes. However, in this case, the rising bubbles exert a force on the aggregates of activated sludge and the contaminants that drive them upward. In a membrane bundle near the cartridge head, not all of the aggregates and contaminants slip from the membrane bundle. These aggregates and contaminants accumulate gradually. A further increase in the amount of aeration increases the number of sludge aggregates and contaminants passing between the hollow fiber membranes. As a result, more aggregates and contaminants accumulate in the bundle near the cartridge head. This may cause the surfaces of the hollow fiber membranes to be blocked.

DISCLOSURE OF THE INVENTION

The present invention relates to a membrane cartridge, a membrane separating method, and a membrane separating device, which use a minimum required amount of aeration to prevent sludge aggregates and contaminants from accumulating on a hollow fiber membrane cartridge and to maintain a membrane filtration performance over a long period.

The inventors have devoted themselves to examinations to find that the use of the structure described below for a hollow fiber membrane cartridge minimizes bubbles of aerated air from the bottom of the lower ring dissipating out of the cartridge. Further, they have found that the structure described below allows at least a specified dimension of gaps to be present between hollow fiber membrane bundles near the cartridge head. This allows sludge aggregates and contaminants to slip out from the cartridge without accumulating between the hollow fiber membranes bundles. The inventors have thus completed the present invention.

The present invention is configured as described below.

(1) A hollow fiber membrane cartridge, having one or more hollow fiber membrane bundles each comprising a plurality of hollow fiber membranes and having opposite ends fixedly bonded by an adhesion fixation layer, a cartridge head fixed to an outer periphery of one end of the hollow fiber membrane bundles in a liquid tight manner, and a lower ring fixed to an outer periphery of the other end of the hollow fiber membrane bundles, wherein a hollow portion of each of the hollow fiber membranes is opened at the cartridge head-side end of the cartridge, the hollow portion of the hollow fiber membrane is sealed in a lower ring-side adhesion fixation layer, and a plurality of through-holes are formed in the lower ring-side adhesion fixation layer, and wherein the through-holes are arranged in the hollow fiber membrane bundle, an end of the lower ring projects from an end surface of the lower ring-side adhesion fixation layer, and at least part of the hollow fiber membrane bundles are divided into at least two, plural small bundles in the cartridge head-side adhesion fixation layer.

(2) The hollow fiber membrane cartridge set forth in (1), wherein the at least part of the hollow fiber membrane bundles are divided into at least two, plural small bundles between the lower ring-side adhesion fixation layer and the cartridge head-side adhesion fixation layer.

(3) The hollow fiber membrane cartridge set forth in (1), wherein in each of the small bundles of hollow fiber membranes at a filtration section-side interface of the cartridge head-side adhesion fixation layer, a distance between the hollow fiber membranes located closest to each other is less than 2 mm, the number of hollow fiber membranes is at least 10 and at most 1,000, and a distance between the small bundles located closest to each other is at least 2 mm and at most 100 mm.

(4) The hollow fiber membrane cartridge set forth in (1), wherein the small bundles of hollow fiber membranes at the filtration section-side interface of the cartridge head-side adhesion fixation layer are arranged on one or more concentric circles.

(5) The hollow fiber membrane cartridge set forth in (4), wherein the hollow fiber membrane bundles are present in all directions from a central portion to outer peripheral portions of the concentric circles of the filtration section-side interface of the cartridge head-side adhesion filtration layer.

(6) The hollow fiber membrane cartridge set forth in (1), wherein a resin forming the filtration section-side interfaces of the cartridge head- and lower ring-side adhesion fixation layers has a hardness (measured in conformity with JISK6253 and ISO7619) of at least 20 A and at most 90 A.

(7) A membrane separation device wherein the hollow fiber membrane cartridge set forth in any of (1) to (6) is placed vertically in a container having an inlet port, and a gas input port is formed at a bottom of the lower ring of the hollow fiber membrane cartridge so that during filtration and/or back wash reverse filtration, a gas is injected from the gas input port and passes through the plurality of through-holes in the lower ring-side adhesion fixation layer to oscillate the hollow fiber membranes.

(8) A membrane separation method comprising introducing raw water to be treated into a container and carrying out suction filtration and back wash reverse filtration while aerating a bottom of the lower ring of the hollow fiber membrane cartridge set forth in any of (1) to (6) and arranged vertically in the container.

By operating a hollow fiber membrane cartridge and a membrane separation device in accordance with the present invention, it is possible to prevent sludge from accumulating on the surfaces of the hollow fiber membranes and to inexpensively achieve a stable filtration performance over a long period.

DESCRIPTION OF REFERENCE NUMERALS

1 Hollow fiber membrane bundle
2 Cartridge head
3 Lower ring
4 Cartridge head-side adhesion fixation layer
5 Lower ring-side adhesion fixation layer
6 End surface of cartridge head-side adhesion fixation layer
7 End surface of lower ring-side adhesion fixation layer
8 Through-hole
9 Lower ring-side end
10 Small bundle
11 Side stem
12 Filtration section
13 Filtration section interface of cartridge head-side adhesion fixation layer
14 Filtration section interface of lower ring-side adhesion fixation layer
15 Membrane separation device
16 Container
17 Inlet port
18 Hollow fiber membrane cartridge
19 Aeration gas injection port
20 Treated water outlet
21 Aeration gas input port

BEST MODE FOR CARRYING OUT THE INVENTION

Figure 1:
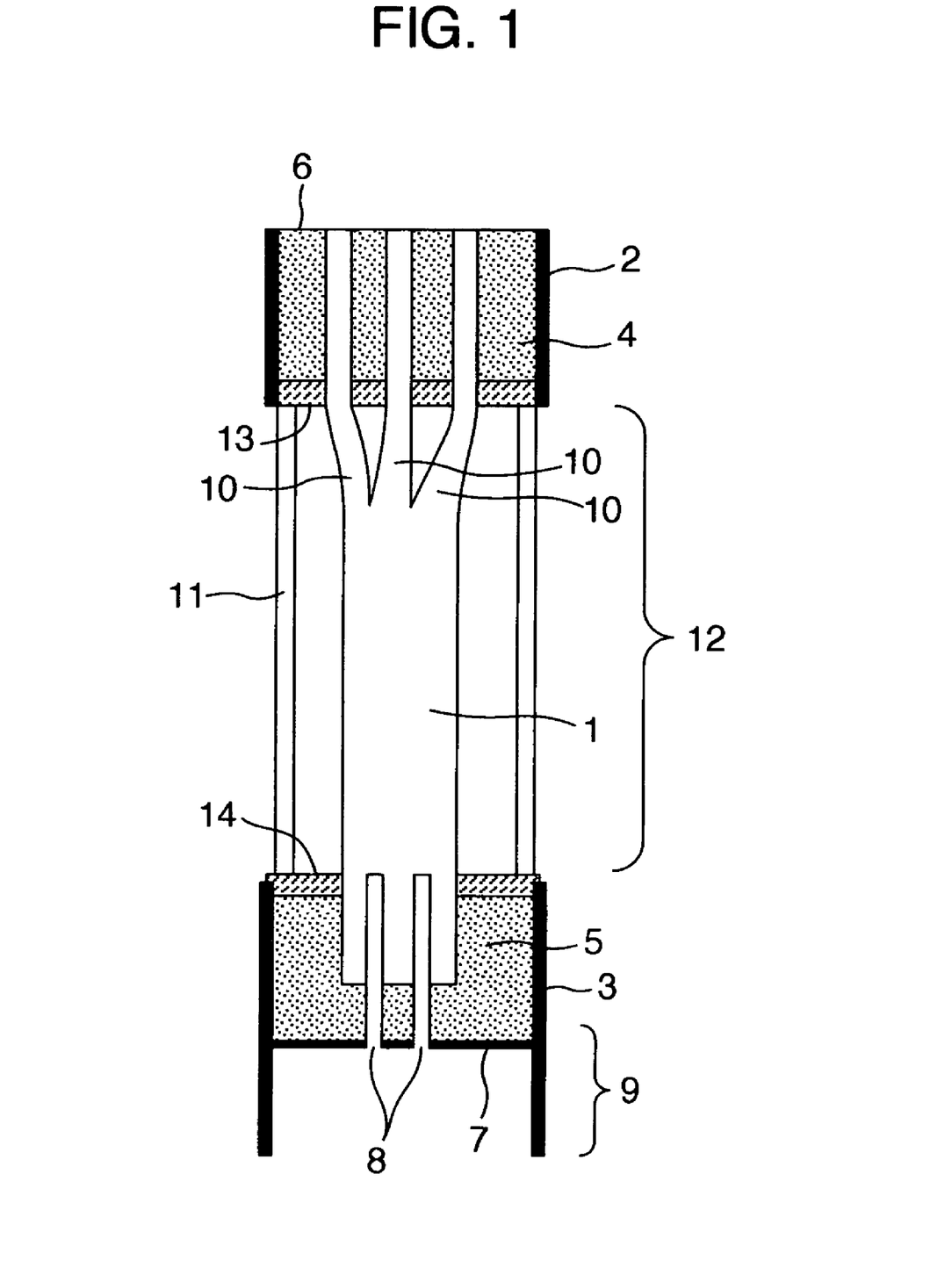
FIG. 1 is a sectional view illustrating an example of an embodiment of a hollow fiber membrane cartridge in accordance with the present invention.

With reference to FIG. 1, an embodiment of a hollow fiber membrane cartridge in accordance with the present invention will be described below. The present hollow fiber membrane cartridge has a hollow fiber membrane bundle 1 consisting of a plurality of hollow fiber membranes (the hollow fiber membrane cartridge in accordance with the present invention may have one or more hollow fiber membrane bundles but in this embodiment, it has only one hollow fiber membrane bundle), and a cartridge head 2 and a lower ring 3 located at opposite ends of the hollow fiber membrane bundle 1. The hollow fiber membranes are fixed using a cartridge head-side adhesion fixation layer 4 and a lower ring-side adhesion fixation layer 5. Each of the hollow fiber membranes is open at the cartridge head-side end (in an end surface 6 of the cartridge head-side adhesion fixation layer) and has a hollow portion sealed at the lower ring-side end of the cartridge (in the lower ring-side adhesion fixation layer). Lower ring 3 has a lower ring end 9 projecting from an end surface of the lower ring-side adhesion fixation layer. A plurality of through-holes 8 are present in the lower ring-side adhesion fixation layer 5. The hollow fiber membrane bundle 1 is divided into at least two, plural smaller bundles 10 in the cartridge head-side adhesion fixation layer 4. In general, in the hollow fiber membrane cartridge in accordance with the present invention, the hollow fiber membrane bundle may be divided into at least two, plural smaller bundles at a position remote from the cartridge head-side adhesion fixation layer. The cartridge head 2 and the lower ring 3 are connected together by a side stem 11. The part of each hollow fiber membrane not fixed in the adhesion fixation layers at its opposite ends is defined as a filtration section 12. The part of the cartridge head-side adhesion fixation layer 4 which faces the filtration section is defined as a filtration section interface 13 of the cartridge head-side adhesion fixation layer. The part of the lower ring-side adhesion fixation layer 5 which faces the filtration section is defined as a filtration section interface 14 of the lower ring-side adhesion fixation layer.

The hollow fiber membrane cartridge in accordance with the present invention may have one or more hollow fiber membrane bundles as described above. If a plurality of hollow fiber membrane bundles are used, all of them may be divided into a plurality of smaller bundles or some of them may not be divided into a plurality of smaller bundles. If only one hollow fiber membrane is used, the hollow fiber membrane is divided into a plurality of smaller bundles (as in the case of the present embodiment).

Bubbles pass through the plurality of through-holes in the lower ring-side adhesion fixation layer. The bubbles then rise almost vertically through the gap between the hollow fiber membranes while oscillating the hollow fiber membranes. However, near the cartridge head-side adhesion fixation layer, the hollow fiber membranes have a smaller amplitude and the size of the gap decreases. Accordingly, the bubbles cannot rise and disperse in a circumferential direction to slip out of the cartridge. If the filling factor of the membrane has been increased to reduce the size of the gap between the hollow fiber membranes, solids and fibrous substances contained in the sludge as well as deposits of the sludge cannot pass through the hollow fiber membranes. These substances are collected between the hollow fiber membranes. This reduces the filtration area and makes filtration difficult.

To allow sludge deposits to be easily removed while increasing the filling factor of the hollow fiber membranes, it is necessary to form a sparse area in each hollow fiber membrane near the cartridge head-side adhesion fixation layer so as to provide a channel through which the sludge deposits slip. That is, in an effective structure, each hollow fiber membrane bundle is divided into at least two, plural smaller bundles so that aeration bubbles and sludge deposits can pass through the channel between the hollow fiber membrane bundles.

Further, it is preferable in the following regard to divide each hollow fiber membrane bundle into at least two, plural smaller bundles between the lower ring-side adhesion fixation layer and the cartridge head-side adhesion fixation layer then aerated air from the bottom of the lower ring is prevented from dissipating out of the cartridge, thus improving the washing effect. When the hollow fiber membranes form a plurality of intermingled areas between the lower ring-side adhesion fixation layer and the cartridge head-side adhesion fixation layer, oscillation based on aeration is preferably improved while dissipation out of the cartridge is prevented.

In each of the small bundles of hollow fiber membranes at the filtration section-side interface of the cartridge head-side adhesion fixation layer, the distance between the hollow fiber membranes located closest to each other is preferably less than 2 mm, more preferably less than 1 mm. This distance enables an increase in the area of the hollow fiber membranes and increases the amount of water filtered by the membrane cartridge. Here, the distance between the hollow fiber membranes means the distance between the outermost surfaces of hollow fibers. Further, the number of hollow fiber membranes constituting each small bundle is preferably at least 10 and at most 1,000, more preferably at least 20 and at most 300. This range reduces the number of sludge aggregates and contaminants that accumulate between the hollow fiber membranes. The distance between the small bundles located closest to each other is preferably at least 2 mm and at most 100 mm, more preferably at least 3 mm and less than 30 mm. Within this range, no sludge or contaminant is accumulated, thus enabling an increase in the filling factor of the hollow fiber membranes and in the amount of filtrate. The distance between the small bundles herein refers to the shortest of the distances between the outermost surfaces of the hollow fiber membranes contained in the respective small bundles.

When the small bundles of hollow fiber membranes at the filtration section-side interface of the cartridge head-side adhesion fixation layer are arranged in one or more concentric circles, aeration bubbles can be uniformly discharged in the circumferential direction. Thus, sludge deposits can be effectively removed with a minimum amount of aeration.

Further, when the hollow fiber membranes are present in all directions between a central portion and an outer peripheral portion of the concentric circles at the filtration section-side interface of the cartridge head-side adhesion fixation layer (this means that the central portion of filtration section-side interface of the cartridge head-side adhesion fixation layer cannot be viewed from the outside of the cartridge, or any lines extending from the central portion to the outer peripheral portion of the concentric circles pass through the bundle of hollow fiber membranes in all cases), the flow of aeration air is prevented from being biased toward particular directions from the central portion to the outer peripheral portion of the cartridge. Consequently, the sludge deposits and contaminants can be uniformly removed.

The number of hollow fiber membranes contained in the small bundles may be the same or different among the small bundles provided that it is within the above range. However, preferably, all the small bundles contain the same number of hollow fiber membranes and/or the small bundles are arranged at uniform intervals in the concentric circle. This allows the sludge deposits to be uniformly discharged.

The hollow fiber membrane bundles (small bundles) may have any shape such as a circle, an ellipse, or a polygon. However, preferably, all the small bundles have the same shape or all the small bundles on the same circumference have the same shape. This allows the sludge deposits to be uniformly discharged.

On the other hand, the set of hollow fiber membranes in the lower ring-side adhesion fixation layer may be formed into a single bundle structure or divided into a plurality of small bundles. In particular, the former is preferable because bubbles resulting from aeration of a single bundle are unlikely to dissipate before reaching the cartridge head.

If the hollow fiber membrane bundle is divided into at least two, plural bundles, the hollow fiber membranes are preferably intermingled with one another between the lower ring-side adhesion fixation layer and the cartridge head-side adhesion fixation layer. This prevents aeration bubbles from dissipating out of the cartridge.

Figure 2:
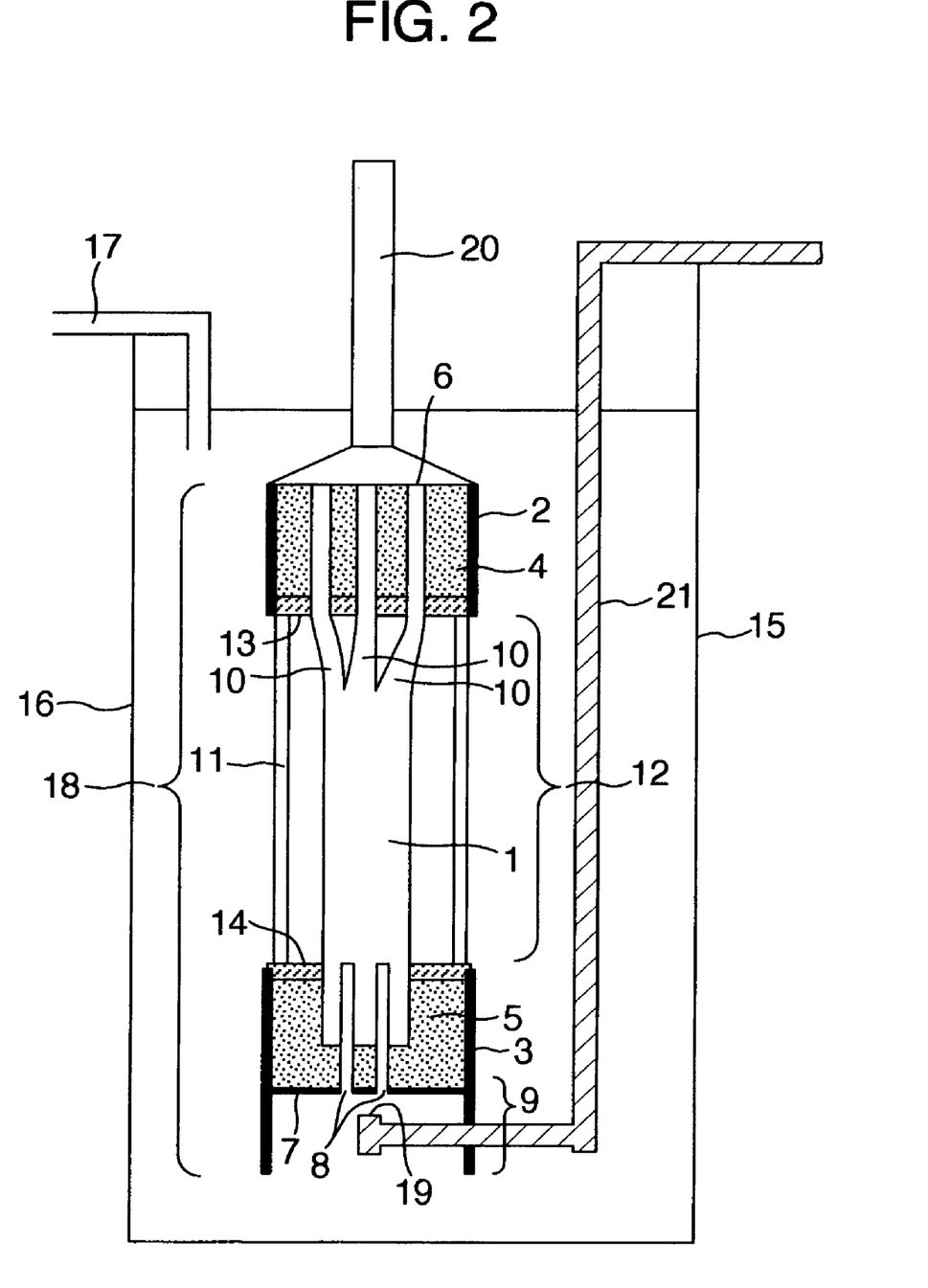
FIG. 2 is a sectional view illustrating an example of an embodiment of a membrane separation device in accordance with the present invention.

With reference to FIG. 2, an embodiment of a membrane separation device using a hollow fiber membrane cartridge in accordance with the present invention will be described.

In FIG. 2, a hollow fiber membrane cartridge 18 is composed of the plurality of hollow fiber membrane bundles 1, each containing a set of hollow fiber membranes, a cartridge head 2, and a lower ring 3. At one end of the hollow fiber membrane bundle 1, the hollow fiber membranes are integrally joined together using an adhesive and are integrally bonded to the interior of the cartridge head-side adhesion fixation layer 4. The ends of the hollow fiber membranes are open to a treated water outlet 20—side end surface of cartridge head 2. At the other end of the hollow fiber membranes, the hollow fiber membranes are integrally joined together using an adhesive to constitute the lower ring-side adhesion fixation layer 5. The ends of the hollow fiber membranes are sealed. A plurality of holes 8 are formed in the lower ringside adhesion fixation layer 5 to introduce raw water and a washing gas into the hollow fiber membrane bundle to effectively contact the water and gas with the outer peripheral surfaces of the hollow fiber membranes.

The diameter of the hollow fiber membrane cartridge 18 is preferably 30 to 800 mm, more preferably 100 to 800 mm. The length of the hollow fiber membrane cartridge is preferably 300 to 3,000 mm.

In the present invention, to prevent the lower ring from being raised or twisted during aeration, the cartridge head-side adhesion fixation layer 4 and the lower ring-side adhesion fixation layer 5 are fixedly connected together using side stems 11, which are rods, pipes, plates, chains, strings, or nets. In particular, side stems 11 are preferably rods or pipes and their material is preferably metal or resin. The rods or pipes may have any shape but are preferably cylindrical. A shape with an acute angle is not suitable because repeated contacts with such a shape may damage the hollow fiber membranes. The thickness of the side stem is preferably determined taking into account the strength of the material under deformation. If pipes or rods used for connection have a high hardness, their surfaces are preferably coated with a resin or the like which has a low hardness. This prevents repeated contacts with these rods from damaging the hollow fiber membranes.

The pore size of the hollow fiber membranes used in the present invention is not particularly limited. The hollow fiber membrane may be any of a variety of types including a reverse osmosis membrane, an ultrafilter membrane, a micofiltration membrane, or a precision filtration film. Further, the material for the hollow fiber membrane is not particularly limited. Examples of the material include polysulfone, polyether sulfone, polyacrylonitrile, polyimide, polyetherimide, polyamide, polyetherketone, polyether etherketone, polyethylene, polypropylene, poly-4-methylpentene, cellurose, cellulose acetate, polyvinylidene fluoride, polyethylene-tetrafuluoroethylene copolymer, and polytetrafuluoroethylene. A composite material film of these materials may also be used. The hollow fiber membrane is suitably shaped to have an inner diameter of 50 to 3,000 µm and an inner/outer diameter ratio of 0.3 to 0.8.

In the present invention, the cartridge head-side adhesion fixation layer and lower ring-side adhesion fixation layer of the hollow fiber membrane cartridge are composed of an adhesive consisting of a material illustrated below. Examples of the adhesive include a polymer material such as an epoxy resin, a urethane resin, an epoxy acrylate resin, or a silicon resin.

The hardness of the resin at the filtration section-side interfaces of the cartridge head-side and lower ring-side adhesion fixation layers preferably has a hardness of 20 A to 90 A, more preferably 20 A to 70 A. (The resin hardness is measured in conformity with JISK6253 and ISO7619. This applies to the description below.) With a resin hardness of at most 20 A, the resin cannot maintain its shape over a long period owing to insufficient hardness. With a resin hardness of more than 90 A, distortion stresses resulting from the oscillation of the hollow fiber membranes cannot be relaxed, and the hollow fiber membranes may be broken. Accordingly, the resin hardness at the interface can be adjusted to a preferable value by using a low-hardness resin as an adhesive or coating the first-stage bonded fixed layer with a low-harness resin. For example, the resin hardness at the interface can be adjusted by forming an adhesion fixation layer using an epoxy resin and then bonding a silicon resin to the epoxy resin, or forming an adhesion fixation layer using a urethane resin and then bonding a urethane resin of a lower hardness to the first urethane resin. The bonding can be carried out using any well-known method such as centrifugal bonding or stationary bonding. To improve the hardening and shrinkage or strength of the adhesive, the adhesive may contain fibrous substances such as glass fibers or carbon fibers or fine powder such as carbon black, alumina, or silica in the adhesive.

In the present invention, the materials for the cartridge head 2 and lower ring 3 are not particularly limited and may be the same or different. However, a preferable material is a thermoplastic resin or stainless steel. The cartridge head 2 also serves to fix the hollow fiber membrane cartridge 18 when it is hung in the container. Accordingly, the cartridge head is shaped in accordance with the hanging and fixing structure.

For example, steps or grooves may be formed in an outer peripheral portion or thread grooves may be formed. Examples of a method for hanging the cartridge in the container include a tank system in which the cartridge is fixed to isolating plates for isolating the tank in the vertical direction, or a rack system in which the cartridge is fixed to a branch pipe branching from a main pipe. The cartridge in accordance with the present invention is suitably applicable to any of these methods.

The through-holes 8 formed in the lower ring-side adhesion fixation layer 5 are open in the adhesion fixation layer itself. The size of the through-holes is such that their equivalent diameter is 2 to 30 mm. The through-holes may have any shape such as a polygon, for example, a triangle, rectangle, or a hexagon; a circle; an ellipse, a sector, a C-shape, or a star. The number of through-holes is preferably 2 to 300 depending on the cross section of the cartridge and the number of fibers. The through-holes are preferably located uniformly distributive in the adhesion fixation layer section, for example, at intersecting points between multiple circles and radial lines, the intersecting points in a lattice, or the vertices of a large number of equilateral triangles.

In the present invention, lower ring 3 preferably projects downward from the end surface of the lower ring-side adhesion fixation layer and is fixed to the outer periphery of the hollow fiber membrane bundles and is shown as lower ring end 9 in the figure. To prevent gas from dissipating from the bottom, the part of the lower ring 3 projecting from the end surface preferably has a length of 5 to 300 mm depending on the diameter of the cartridge, the amount of gas supplied, and the diameter and number of through-holes. The length of at most 300 mm is preferable because it allows the cartridge to have few useless spaces all over its length. The length of at least 5 mm is preferable because it allows gas supplied to the cartridge to be effectively guided to the through-holes, thus preventing lateral dissipation.

To pass uniformly through the plurality of through-holes 8 in the lower ring-side adhesion fixation layer 5, the gas injected from the aeration air injection port 19 must form a pool of a gas in a space projecting downward in the lower ring 3. Then, the gas from the pool of the gas may be supplied to the through-holes. The thickness of the pool of the gas is preferably at least 30 mm, more preferably at least 50 mm. The position of the aeration air injection port 19 is preferably determined taking into account the thickness of the pool of the gas formed. An aeration air inlet port 21 is connected to the aeration air input port 19. Bubbles are thus supplied to the space projecting downward in the lower ring 3.

Figure 3:
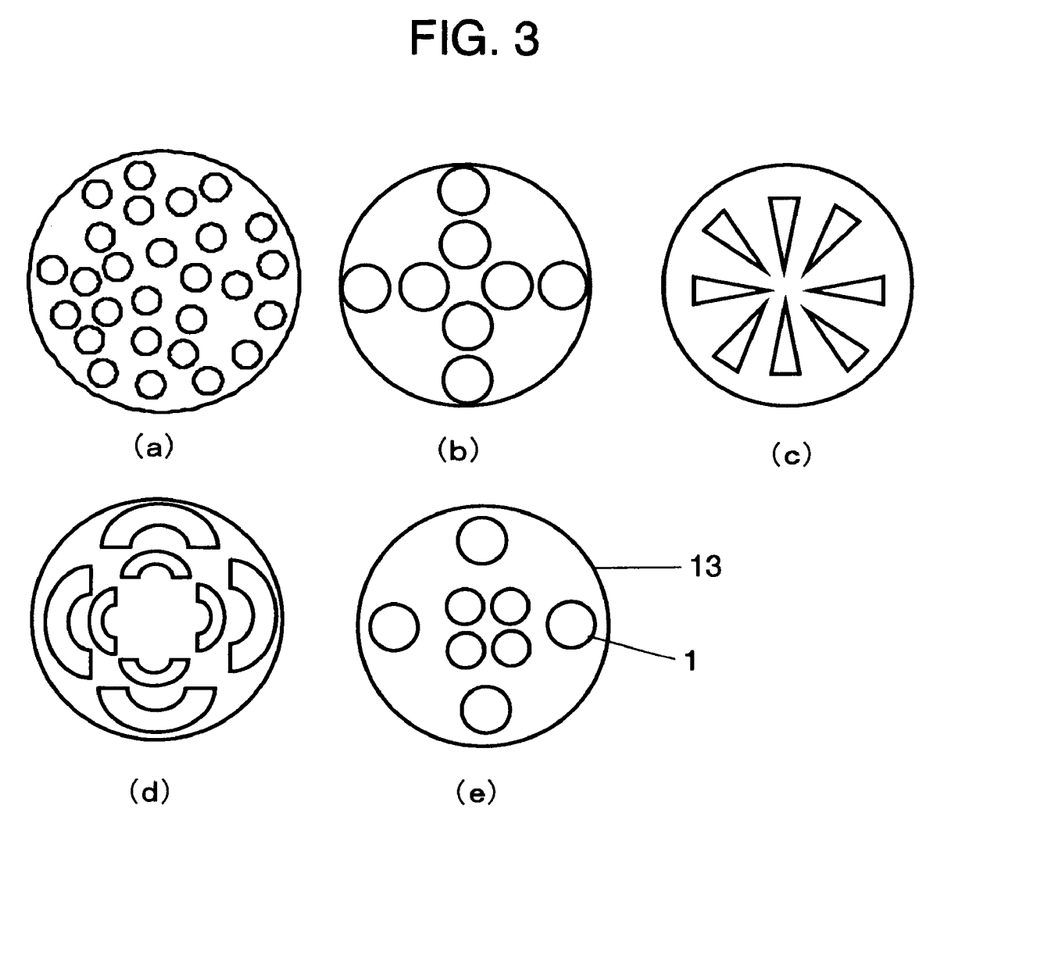
FIGS. 3(a) to (e) are schematic diagrams showing examples of arrangements of small bundles of hollow fiber membranes at a filtration section interface of a cartridge head-side adhesion fixation layer in a membrane separation device in accordance with the present invention.

In the present invention, the hollow fiber membrane bundles 1 may be irregularly arranged at the filtration section interface 13 of the cartridge head-side adhesion fixation layer as shown in FIG. 3(a). However, the bundles 1 are preferably arranged on concentric circles as shown in FIG. 3(b). The hollow fiber membranes need not be circular as shown in FIGS. 3(c) and 3(d). The hollow fiber membranes may have different sizes as shown in FIGS. 3(d) and 3(e).

The filtration section interface 13 of the cartridge head-side adhesion fixation layer is preferably provided with a part in its central portion in which no hollow fiber membranes are arranged. This makes the gas having passed through the through-holes 8 in the lower ring-side adhesion fixation layer 5 unlikely to dissipate to the outer periphery of the cartridge before reaching the vicinity of the cartridge head 2. Further, in the vicinity of the cartridge, the gas dissipates to the outer peripheral portion. This prevents sludge from adhering to the vicinity of the cartridge head, to which sludge is likely to adhere.

Examples of the present invention will be described below but do not limit the present invention.

EXAMPLE 1

A cylindrical hollow fiber membrane cartridge described below was produced. The opposite ends of each of the plurality of hollow fiber membranes were fixedly bonded to the cartridge. The cartridge had a cartridge head fixedly bonded to the outer periphery of one end in a liquid tight manner and a lower ring fixedly bonded to the outer periphery of the other end in a liquid tight manner. The cartridge had a membrane area of 25 m². The hollow fiber membranes were precision filtration membranes made of polyvinylidene fluoride and had a pore size of 0.1 µm. Each of the hollow fiber membranes had an outer diameter of 1.4 mm and an inner diameter of 0.8 mm. The effective length of the membrane between the filtration section interfaces of the cartridge head-side and lower ring-side adhesion fixation layers was 2,000 mm. The adhesion fixation layers at the opposite ends of the hollow fiber membranes had a diameter of about 150 mm.

Figure 4:
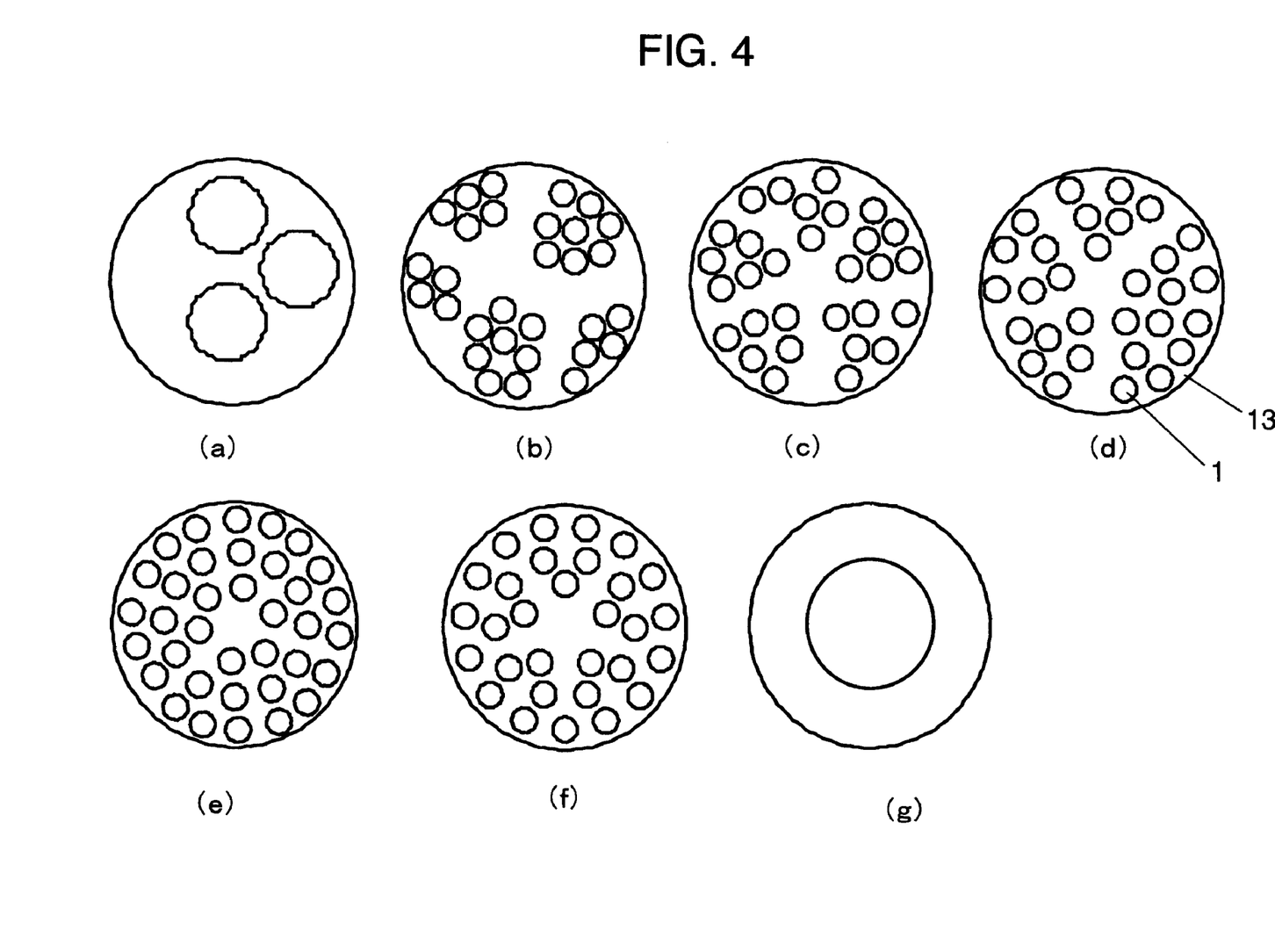
FIGS. 4(a) to (f) are schematic diagrams showing examples of arrangements of small bundles of hollow fiber membranes at a filtration section interface of a cartridge head-side adhesion fixation layer in the membrane separation apparatuses of Examples 1-6.
FIG. 4(g) is a schematic diagram showing an example of a hollow fiber membrane at a filtration section interface of a cartridge head-side adhesion fixation layer in the membrane separation apparatus of Comparative Example 1.

At the filtration section interface of the cartridge head-side adhesion fixation layer, 1,100 hollow fiber membranes were bundled per small bundle. Three small bundles were arranged as shown in FIG. 4(a). The spacing between the small bundles was 3 mm. To arrange the small bundles as shown in FIG. 4(a), a porous plate was produced which was made of resin and in which holes were opened. The porous plate was installed inside the cartridge. Then, the small bundles were passed through the respective holes in the porous plate. The small bundles were then fixed and then bonded to the inside of the cartridge. On the other hand, the hollow fiber membranes were formed into a single bundle, which was fixedly bonded to the lower ring-side adhesion fixation layer. In this case, 24 through-holes each of diameter of 11 mm were formed in the hollow fiber membrane bundle. A urethane resin (manufactured by SANYU REC CO., LTD.; SA-6330; hardness after hardening: 98 A) was used for bonding. After concentric bonding, a urethane resin (manufactured by SANYU REC CO., LTD.; SA-6330; hardness after hardening: 56 A) was stationarily fixed to the interface between the bonded and non-bonded portions of the hollow fiber membrane.

During concentric adhesion, two SUS304 pipes having an outer diameter of 13 mm and coated with a vinylidene chloride film were fixedly connected together to constitute a cartridge head-side adhesion fixation layer and a lower ring-side adhesion fixation layer.

An aeration air input pipe was inserted into the lower ring through its side surface. An aeration air injection port of diameter 2 cm was installed 20 cm below the lower ring-side adhesion fixation layer and in an almost central portion of the lower ring in the horizontal direction.

The membrane separation device in accordance with the present invention was immersed in an activated sludge tank of capacity 8 m³. The cartridge head and a filtrate pipe were connected together and fixed to the activated sludge tank.

Aeration was carried out in the membrane separation device in accordance with the present invention using 6 Nm³/hr of air fed through the aeration air input pipe. At the same time, a suction pump was used to carry out suction and filtration so that a membrane filtration flow was 0.6 m³/membrane area m²/day. In this case, inter-membrane differential pressure remained stable at −15 to −20 kPa for three months. During an evaluation period, the concentration MLSS in the activated sludge tank was 10,000 mg/l on average, and the average temperature was 25° C. City sewage of average BOD 150 mg/l and SS 160 mg/l was used as raw water for activated sludge.

After three months of operation, sludge fouling or contaminants weighed 3.23 kg, indicating a small amount of the fouling. The weight of sludge fouling or contaminants was defined as the difference between the weights of the cartridge measured before and after use in wet hollow filter membranes.

EXAMPLE 2

At the filtration section interface of the cartridge head-side adhesion fixation layer, 110 hollow fiber membranes were bundled per small bundle. The number of small bundles was 30, and the spacing between the small bundles was 1.5 mm. A membrane separation device was produced in the same manner as in Example 1 except it had an arrangement as shown in FIG. 4(b).

The membrane separation device was immersed in an activated sludge tank and operated as in the case with Example 1. Then, the inter-membrane differential pressure remained stable at −15 to −20 kPa for three months. After the three months of operation, sludge fouling or contaminants adhering to the cartridge weighed 2.53 kg, indicating a small amount of the fouling.

EXAMPLE 3

At the filtration section interface of the cartridge head-side adhesion fixation layer, 110 hollow fiber membranes were bundled per small bundle. The number of small bundles was 30, and the spacing between the small bundles was 2.0 mm. A membrane separation device was produced in the same manner as in Example 1 except it had an arrangement as shown in FIG. 4(c).

The membrane separation device was immersed in an activated sludge tank and operated as in the case with Example 1. Then, the inter-membrane differential pressure remained stable at −15 to −20 kPa for three months. After the three months of operation, sludge fouling or contaminants adhering to the cartridge weighed 2.03 kg, indicating a small amount of the fouling.

EXAMPLE 4

At the filtration section interface of the cartridge head-side adhesion fixation layer, 110 hollow fiber membranes were bundled per small bundle. The number of small bundles was 30, and the spacing between the small bundles was 3.0 mm. A membrane separation device was produced in the same manner as in Example 1 except it had an arrangement as shown in FIG. 4(d).

The membrane separation device was immersed in an activated sludge tank and operated as in the case with Example 1. Then, the inter-membrane differential pressure remained stable at −15 to −20 kPa for three months. After the three months of operation, sludge attachments or contaminants adhering to the cartridge weighed 1.23 kg, indicating a small amount of the attachments.

EXAMPLE 5

At the filtration section interface of the cartridge head-side adhesion fixation layer, 110 hollow fiber membranes were bundled per small bundle. The number of small bundles was 30, and the spacing between the small bundles was 3.0 mm. The small bundles were arranged on concentric circles. A membrane separation device was produced in the same manner as in Example 1 except it had an arrangement as shown in FIG. 4(e).

The membrane separation device was immersed in an activated sludge tank and operated as in the case with Example 1. Then, the inter-membrane differential pressure remained stable at −15 and −20 kPa for three months. After the three months of operation, sludge fouling or contaminants adhering to the cartridge weighed 0.56 kg, indicating a small amount of the fouling.

EXAMPLE 6

At the filtration section interface of the cartridge head-side adhesion fixation layer, 110 hollow fiber membranes were bundled per small bundle. The number of small bundles was 30, and the spacing between the small bundles was 3.0 mm. The small bundles were arranged in concentric circles so as to be preset in all the circumferential directions from the center of the cartridge (FIG. 4(f)). A membrane separation device was produced in the same manner as in Example 1 except for this arrangement.

The membrane separation device was immersed in an activated sludge tank and operated as in the case with Example 1. Then, the inter-membrane differential pressure remained stable at −15 to −20 kPa for three months. After the three months of operation, sludge fouling or contaminants adhering to the cartridge weighed 0.52 kg, indicating a very small amount of the fouling.

Comparative Example 1

A membrane separation device was produced as in the case of Example 1 except that the hollow fiber membranes were formed into a single bundle at the filtration section interface of the cartridge head-side adhesion fixation layer as shown in FIG. 4(g) rather than being divided in small bundles. The membrane separation device was then operated in the activated sludge tank under the same filtration conditions and was then evaluated.

In this case, the inter-membrane differential pressure rose rapidly to −80 kPa in 14 days, thus disabling pump suction. After three months of operation, the concentration MLSS in the activated sludge tank was 10,000 mg/l on average and the average temperature was 25° C., as in the case of Example 1. City sewage of average BOD 150 mg/l and SS 160 mg/l was used as raw water for activated sludge as in the case of Example 1.

After the operation, sludge fouling or contaminants adhering to the cartridge weighed 10.1 kg, indicating a very large amount of the fouling.

INDUSTRIAL APPLICABILITY

The hollow fiber membrane cartridge in accordance with the present invention is installed and used in a pressure or suction type tank filter device or an immersion type filter device. More specifically, the hollow fiber membrane cartridge in accordance with the present invention is used for a filter device that removes turbidity and bacteria from raw water such as river water, lake water, underground water, seawater, domestic liquid waste, industrial liquid waste, or sewage secondary treated water, or for a membrane separation activated sludge device that uses membranes to separate activated sludge into solids and liquids.

The invention claimed is:

1. A hollow fiber membrane cartridge, having one or more hollow fiber membrane bundles each comprising a plurality of hollow fiber membranes and having opposite ends fixedly bonded by an adhesion fixation layer, a cartridge head fixed to an outer periphery of one end of the hollow fiber membrane bundles in a liquid tight manner, and a lower ring fixed to an outer periphery of the other end of the hollow fiber membrane bundles, wherein a hollow portion of each of the hollow fiber membranes is opened at the cartridge head-side end of the cartridge, the hollow portion of the hollow fiber membrane is sealed in a lower ring-side adhesion fixation layer, and a plurality of through-holes are formed in the lower ring-side adhesion fixation layer, and wherein the through-holes are arranged in the hollow fiber membrane bundle, an end of the lower ring projects from an end surface of the lower ring-side adhesion fixation layer, and at least part of the hollow fiber membrane bundles are divided into at least two, plural small bundles between the lower ring-side adhesion layer and the cartridge head-side adhesion fixation layer, such that there are more bundles at the head-side adhesion fixation layer than the lower ring-side adhesion layer.

2. The hollow fiber membrane cartridge according to claim 1, wherein in each of the small bundles of hollow fiber membranes at a filtration section-side interface of the cartridge head-side adhesion fixation layer, a distance between the hollow fiber membranes located closest to each other is less than 2 mm, the number of hollow fiber membranes is at least 10 and at most 1,000, and a distance between the small bundles located closest to each other is at least 2 mm and at most 100 mm.

3. The hollow fiber membrane cartridge according to claim 1, wherein the small bundles of hollow fiber membranes at the filtration section-side interface of the cartridge head-side adhesion fixation layer are arranged on one or more concentric circles.

4. The hollow fiber membrane cartridge according to claim 3, wherein the hollow fiber membrane bundles are present in all directions from a central portion to outer peripheral portions of the concentric circles of the filtration section-side interface of the cartridge head-side adhesion fixation layer.

5. The hollow fiber membrane cartridge according to claim 1, wherein a resin forming the filtration section-side interfaces of the cartridge head- and lower ring-side adhesion fixation layers has a hardness (measured in conformity with JISK6253 and ISO7619) of at least 20 A and at most 90 A.

6. A membrane separation device wherein the hollow fiber membrane cartridge according to any of claims 1 and 2-5 is placed vertically in a container having an inlet port, and a gas input port is formed at a bottom of the lower ring of the hollow fiber membrane cartridge so that during filtration and/or back wash reverse filtration, a gas is injected from the gas input port and passes through the plurality of through-holes in the lower ring-side adhesion fixation layer to oscillate the hollow fiber membranes.

7. A membrane separation method comprising introducing raw water to be treated into a container and carrying out suction filtration and back wash reverse filtration while aerating a bottom of the lower ring of the hollow fiber membrane cartridge according to any of claims 1 and 2-5 and arranged vertically in the container.

* * * * *

UNITED STATES PATENT AND TRADEMARK OFFICE
CERTIFICATE OF CORRECTION

| | | |
|---|---|---|
| PATENT NO. | : 7,578,940 B2 | Page 1 of 1 |
| APPLICATION NO. | : 10/561182 | |
| DATED | : August 25, 2009 | |
| INVENTOR(S) | : Tomotaka Hashimoto | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Twenty-eighth Day of September, 2010

David J. Kappos
*Director of the United States Patent and Trademark Office*